US011791875B2

(12) United States Patent
Gong et al.

(10) Patent No.: US 11,791,875 B2
(45) Date of Patent: *Oct. 17, 2023

(54) DEVICE, SYSTEM AND METHOD OF SIMULTANEOUSLY COMMUNICATING WITH A GROUP OF WIRELESS COMMUNICATION DEVICES (71) Applicant: INTEL CORPORATION, Santa Clara, CA (US)

(72) Inventors: Michelle X. Gong, Sunnyvale, CA (US); Robert J. Stacey, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 17/188,159

(22) Filed: Mar. 1, 2021

(65) Prior Publication Data
US 2021/0258054 A1 Aug. 19, 2021

Related U.S. Application Data (63) Continuation of application No. 16/543,923, filed on Aug. 19, 2019, now Pat. No. 10,938,463, which is a
(Continued)

(51) Int. Cl.
H04W 72/02 (2009.01)
H04B 7/06 (2006.01)
(Continued)

(52) U.S. Cl.
CPC ......... H04B 7/0617 (2013.01); H04B 7/0421 (2013.01); H04B 7/0626 (2013.01); H04W 72/30 (2023.01); H04W 74/0816 (2013.01)

(58) Field of Classification Search
CPC .. H04B 7/0421; H04B 7/0617; H04B 7/0626; H04W 72/005; H04W 74/0816
See application file for complete search history.

(56) References Cited

U.S. PATENT DOCUMENTS 4,599,719 A 7/1986 Breen et al.
6,072,784 A 6/2000 Agrawal et al.
(Continued)

FOREIGN PATENT DOCUMENTS

CN 1329444 1/2002
CN 1849788 10/2006
(Continued)

OTHER PUBLICATIONS

Office Action for Japanese Patent Application No. 2015-240925, dated Sep. 27, 2016, 16 pages (Including 9 pages of English translation).

(Continued)

Primary Examiner — Phuc H Tran
(74) Attorney, Agent, or Firm — Shichrur & Co.

(57) ABSTRACT

Some demonstrative embodiments include devices, systems and/or methods of simultaneously communicating with a group of wireless communication devices. For example, a device may include a wireless communication unit to communicate with at least one group of a plurality of wireless communication devices over a wireless communication medium, wherein the wireless communication unit is to reserve the wireless communication medium for a time period, during which the wireless communication unit is to simultaneously transmit two or more different wireless communication transmissions to two or more wireless communication devices of the group, respectively. Other embodiments are described and claimed.

21 Claims, 4 Drawing Sheets

Related U.S. Application Data continuation of application No. 15/281,088, filed on Sep. 30, 2016, now Pat. No. 10,447,364, which is a continuation of application No. 14/920,054, filed on Oct. 22, 2015, now Pat. No. 10,256,881, which is a continuation of application No. 12/642,818, filed on Dec. 20, 2009, now Pat. No. 9,173,191.

(51) Int. Cl.
*H04W 72/30* (2023.01)
*H04W 74/08* (2009.01)
*H04B 7/0417* (2017.01)

(56) References Cited

U.S. PATENT DOCUMENTS

| | | | |
|---|---|---|---|
| 6,088,345 A | 7/2000 | Sakoda et al. | |
| 6,108,565 A | 8/2000 | Scherzer | |
| 6,233,466 B1 | 5/2001 | Wong et al. | |
| 6,347,234 B1 | 2/2002 | Scherzer | |
| 6,501,747 B1 | 12/2002 | Friedlander et al. | |
| 6,616,452 B2 | 9/2003 | Clark et al. | |
| 6,650,714 B2 | 11/2003 | Dogan et al. | |
| 6,650,881 B1 | 11/2003 | Dogan | |
| 6,694,155 B1 | 2/2004 | Chin et al. | |
| 6,731,689 B2 | 5/2004 | Dogan | |
| 6,768,747 B1 | 7/2004 | Dogan | |
| 6,801,589 B1 | 10/2004 | Dogan | |
| 6,807,412 B2 | 10/2004 | Ohmoto | |
| 6,879,845 B2 | 4/2005 | Suzuki et al. | |
| 6,888,882 B1 | 5/2005 | Dogan | |
| 6,931,030 B2 | 8/2005 | Dogan | |
| 6,966,775 B1 | 11/2005 | Kendir et al. | |
| 6,983,167 B2 | 1/2006 | Adachi et al. | |
| 7,046,650 B2 | 5/2006 | Sherman | |
| 7,167,526 B2 | 1/2007 | Liang et al. | |
| 7,206,550 B2 | 4/2007 | Li et al. | |
| 7,277,679 B1 | 10/2007 | Barratt et al. | |
| 7,428,747 B2 | 9/2008 | Dawson | |
| 7,447,270 B1 | 11/2008 | Hottinen | |
| 7,542,454 B2 | 6/2009 | Lin et al. | |
| 7,542,515 B2 | 6/2009 | Li et al. | |
| 7,583,694 B2 | 9/2009 | Stephens | |
| 7,609,780 B2 | 10/2009 | Sadowsky | |
| 7,620,019 B1 | 11/2009 | Smith et al. | |
| 7,702,298 B2 | 4/2010 | Barratt et al. | |
| 7,751,494 B2 | 7/2010 | Borkar et al. | |
| 7,769,098 B2 | 8/2010 | Borkar et al. | |
| 7,804,800 B2 | 9/2010 | Li et al. | |
| 7,848,444 B2 | 12/2010 | Yamaura | |
| 7,924,943 B2 | 4/2011 | Kim et al. | |
| 8,089,946 B2 | 1/2012 | Brommer | |
| 8,099,289 B2 | 1/2012 | Mozer et al. | |
| 8,102,956 B2 | 1/2012 | Dai et al. | |
| 8,116,694 B2 | 2/2012 | Kaaja et al. | |
| 8,194,720 B2 | 6/2012 | Yamaura | |
| 8,204,145 B2 | 6/2012 | Sadowsky | |
| 8,260,198 B2 | 9/2012 | Yamaura | |
| 8,306,089 B2 | 11/2012 | Merlin et al. | |
| 8,374,154 B2 | 2/2013 | Gong et al. | |
| 8,462,686 B2 | 6/2013 | Liu et al. | |
| 8,553,548 B2 | 10/2013 | Liu et al. | |
| 8,737,281 B2 | 5/2014 | Liu et al. | |
| 9,173,191 B2 | 10/2015 | Gong et al. | |
| 9,270,431 B2 | 2/2016 | Zhang et al. | |
| 9,320,048 B2 | 4/2016 | Liu et al. | |
| 9,402,226 B2 | 7/2016 | Abraham et al. | |
| 9,445,432 B2 | 9/2016 | Tan et al. | |
| 9,450,727 B2 | 9/2016 | Nory et al. | |
| 10,938,463 B2 | 3/2021 | Gong et al. | |
| 2002/0051953 A1 | 5/2002 | Clark et al. | |
| 2002/0068590 A1 | 6/2002 | Suzuki et al. | |
| 2002/0122498 A1 | 9/2002 | Dogan | |
| 2002/0150182 A1 | 10/2002 | Dogan et al. | |
| 2003/0123530 A1 | 7/2003 | Maeda et al. | |
| 2005/0002355 A1 | 1/2005 | Takano | |
| 2005/0089057 A1 | 4/2005 | Kang et al. | |
| 2005/0105504 A1 | 5/2005 | Sakoda | |
| 2005/0132223 A1 | 6/2005 | Stephens | |
| 2005/0143014 A1 | 6/2005 | Li et al. | |
| 2005/0147023 A1 | 7/2005 | Stephens et al. | |
| 2005/0147115 A1 | 7/2005 | Li et al. | |
| 2006/0071807 A1 | 4/2006 | Sadowsky | |
| 2006/0140290 A1 | 6/2006 | Li et al. | |
| 2006/0165191 A1 | 7/2006 | Lin et al. | |
| 2006/0176970 A1 | 8/2006 | Dai et al. | |
| 2006/0187964 A1* | 8/2006 | Li | H04L 1/001 370/252 |
| 2006/0203708 A1 | 9/2006 | Sampath et al. | |
| 2007/0153754 A1 | 7/2007 | Shapira et al. | |
| 2007/0153760 A1* | 7/2007 | Shapira | H04W 72/04 370/350 |
| 2007/0201566 A1 | 8/2007 | Solomon et al. | |
| 2007/0230373 A1 | 10/2007 | Li et al. | |
| 2007/0286303 A1 | 12/2007 | Yamaura | |
| 2008/0002636 A1 | 1/2008 | Gaur et al. | |
| 2008/0004078 A1 | 1/2008 | Barratt et al. | |
| 2008/0009288 A1 | 1/2008 | Orfanos et al. | |
| 2008/0014870 A1 | 1/2008 | Kim | |
| 2008/0075033 A1 | 3/2008 | Shattil | |
| 2008/0165875 A1 | 7/2008 | Mundarath et al. | |
| 2008/0219373 A1 | 9/2008 | Zhang et al. | |
| 2008/0232335 A1 | 9/2008 | Del Prado Pavon et al. | |
| 2008/0247370 A1 | 10/2008 | Gu et al. | |
| 2008/0304463 A1 | 12/2008 | Borkar et al. | |
| 2008/0304464 A1 | 12/2008 | Borkar et al. | |
| 2009/0023467 A1 | 1/2009 | Huang et al. | |
| 2009/0046618 A1* | 2/2009 | Shiba | H04L 12/1886 370/312 |
| 2009/0086690 A1 | 4/2009 | Gu et al. | |
| 2009/0121935 A1 | 5/2009 | Xia et al. | |
| 2009/0154372 A1 | 6/2009 | Wang et al. | |
| 2009/0204409 A1 | 8/2009 | Mozer et al. | |
| 2009/0204410 A1 | 8/2009 | Mozer et al. | |
| 2009/0207928 A1 | 8/2009 | Li et al. | |
| 2009/0212921 A1 | 8/2009 | Wild et al. | |
| 2009/0232157 A1 | 9/2009 | Stephens | |
| 2009/0290563 A1 | 11/2009 | Gu et al. | |
| 2009/0290616 A1 | 11/2009 | Sridhara et al. | |
| 2009/0310586 A1 | 12/2009 | Shattil | |
| 2009/0323611 A1 | 12/2009 | Singh et al. | |
| 2010/0046665 A1 | 2/2010 | Sadowsky | |
| 2010/0054230 A1 | 3/2010 | Sridhara et al. | |
| 2010/0067409 A1* | 3/2010 | Takano | H04W 74/0816 370/277 |
| 2010/0091675 A1 | 4/2010 | Sawai | |
| 2010/0103893 A1 | 4/2010 | Xia et al. | |
| 2010/0103900 A1 | 4/2010 | Yeh et al. | |
| 2010/0157901 A1 | 6/2010 | Sanderovitz et al. | |
| 2010/0159845 A1 | 6/2010 | Kaaja et al. | |
| 2010/0208834 A1 | 8/2010 | Van Zelst et al. | |
| 2010/0214169 A1 | 8/2010 | Katie | |
| 2010/0220601 A1 | 9/2010 | Vermani et al. | |
| 2010/0232352 A1 | 9/2010 | Merlin et al. | |
| 2010/0248635 A1 | 9/2010 | Zhang et al. | |
| 2010/0260092 A1 | 10/2010 | Nagaraja | |
| 2010/0265853 A1 | 10/2010 | Song et al. | |
| 2010/0265922 A1 | 10/2010 | Bracha | |
| 2011/0051647 A1 | 3/2011 | Sampath et al. | |
| 2011/0064033 A1 | 3/2011 | Gong et al. | |
| 2011/0096711 A1 | 4/2011 | Liu et al. | |
| 2011/0110454 A1 | 5/2011 | Sampath et al. | |
| 2011/0141892 A1 | 6/2011 | Gong et al. | |
| 2011/0141969 A1 | 6/2011 | Sridhara et al. | |
| 2011/0149731 A1 | 6/2011 | Gong et al. | |
| 2011/0149918 A1 | 6/2011 | Gong et al. | |
| 2011/0149941 A1 | 6/2011 | Gong et al. | |
| 2011/0164526 A1 | 7/2011 | Zhu et al. | |
| 2011/0194644 A1 | 8/2011 | Liu et al. | |
| 2011/0211490 A1 | 9/2011 | Nikula et al. | |
| 2011/0218010 A1 | 9/2011 | Hoymann et al. | |
| 2011/0280188 A1 | 11/2011 | Jeon et al. | |
| 2012/0063439 A1 | 3/2012 | Seok | |
| 2012/0087316 A1 | 4/2012 | Merlin et al. | |

(56) References Cited

U.S. PATENT DOCUMENTS

| | | | |
|---|---|---|---|
| 2013/0003661 A1 | 1/2013 | Matsuo et al. | |
| 2013/0100952 A1* | 4/2013 | Hart | H04L 12/1868 370/432 |
| 2013/0128837 A1 | 5/2013 | Gong et al. | |
| 2013/0294373 A1 | 11/2013 | Matsuo et al. | |
| 2015/0092697 A1* | 4/2015 | Yeow | H04W 24/10 370/329 |
| 2016/0043793 A1 | 2/2016 | Gong et al. | |
| 2016/0050659 A1* | 2/2016 | Seok | H04L 1/1671 370/338 |
| 2016/0105836 A1* | 4/2016 | Seok | H04B 7/0452 370/331 |
| 2016/0330714 A1* | 11/2016 | Hedayat | H04L 1/1621 |
| 2017/0019926 A1 | 1/2017 | Gong et al. | |
| 2017/0347288 A1 | 11/2017 | Merlin et al. | |

FOREIGN PATENT DOCUMENTS

| | | |
|---|---|---|
| CN | 1973502 | 5/2007 |
| CN | 101252417 | 8/2008 |
| CN | 102104940 | 6/2011 |
| EP | 1909406 | 8/2007 |
| JP | 2001358648 | 12/2001 |
| JP | 2005102136 | 4/2004 |
| JP | 2005094337 | 4/2005 |
| JP | 2006085365 | 8/2006 |
| JP | 2007502074 | 2/2007 |
| JP | 2007502077 | 2/2007 |
| JP | 2007517474 | 6/2007 |
| JP | 2007520932 | 7/2007 |
| JP | 2008503957 | 2/2008 |
| JP | 2008092433 | 4/2008 |
| JP | 2009522910 | 6/2009 |
| JP | 2009246480 | 10/2009 |
| JP | 2010263491 | 11/2010 |
| JP | 2010283799 | 12/2010 |
| JP | 2011514109 | 4/2011 |
| JP | 2011523811 | 8/2011 |
| JP | 2012531793 | 12/2012 |
| JP | 0005856257 | 1/2015 |
| WO | 2005015844 | 2/2005 |
| WO | 2005015847 | 2/2005 |
| WO | 2005027422 | 3/2005 |
| WO | 2005062793 | 7/2005 |
| WO | 2005067169 | 7/2005 |
| WO | 2005067218 | 7/2005 |
| WO | 2006000954 | 1/2006 |
| WO | 2006085365 | 8/2006 |
| WO | 2007091317 | 8/2007 |
| WO | 2008084540 | 7/2008 |
| WO | 2009119160 | 10/2009 |
| WO | 2009131867 | 10/2009 |
| WO | 2009142806 | 11/2009 |
| WO | 2010150950 | 12/2010 |

OTHER PUBLICATIONS

Shuichi Obayashi, Standardization and Technical Proposals in IEEE 802.11n, IEICE Technical Report, vol. 106, No. 42, May 11, 2006, 26 pages.

Yuichi Morioka et al., SDMA operation within 802.11, IEEE 802.11-09/xxxxr0, May 9, 2009, 18 pages.

Search Report for European Patent Application No. 10843420.0 dated Jun. 29, 2016, 7 pages.

International Search Report and Written Opinion for PCT/US2010/057288 dated Jun. 28, 2011, 10 pages.

International Search Report and Written Opinion received for PCT Patent Application No. PCT/US2010/057647, dated Aug. 29, 2011, 10 pages.

International Preliminary Report on Patentability Received for PCT Patent Application No. PCT/US2010/057288, dated Jul. 5, 2012, 5 pages.

International Preliminary Report on Patentability Received for PCT Patent Application No. PCT/US2010/057647, dated Jul. 5, 2012, 8 pages.

Office Action from U.S. Appl. No. 12/645,648 dated Jul. 5, 2012, 11 pages.

Office Action from U.S. Appl. No. 12/645,648 dated Feb. 28, 2012, 22 pages.

Office Action received for Chinese Patent Application No. 201010601573.1, dated Mar. 27, 2013, 16 pages of Office Action (including 8 pages of English translation).

Office Action received for Chinese Patent Application No. 201010620098.2, dated Apr. 3, 2013, 16 pages of Office Action (including 10 pages of English translation).

IEEE P802.11n™/D2.00, Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Enhancements for Higher Throughput, Feb. 2007, 498 pages.

Final Office Action for U.S. Appl. No. 12/642,818, dated Apr. 7, 2015, 16 pages.

Office Action for Japanese Patent Application No. 2012-540063, dated Jul. 9, 2013, 6 pages (including 3 pages of English translation).

Office Action for Chinese Patent Application No. 201010620098.2, dated Jan. 2, 2014, 13 pages (including 8 pages of English translation).

Office Action for Chinese Patent Application No. 201010601573.1, dated Dec. 10, 2013, 13 pages (including 7 pages of English translation).

Office Action for Japanese Patent Application No. 2012-545974, dated Nov. 12, 2013, 8 pages (including 4 pages of English translation).

Chan, et al., "Insights from CSMA with Multipacket Reception: Achieving >1 Gbps Aggregate Throughput with a Multiuser-based Physical Layer", IEEE 802.11-09/0859r0, Jul. 16, 2009, 20 pages.

Stacey, et al., "DL MU-MIMO Ack Protocol", IEEE 802.11-09/1172r0, Nov. 16, 2009, 9 pages.

Office Action for Japanese Patent Application No. 2012-540063, dated Mar. 11, 2014, 9 pages (including 5 pages of English translation).

Office Action for Chinese Patent Application No. 201010601573.1, dated May 13, 2014, 6 pages (including 3 pages of English translation).

Office Action for Chinese Patent Application No. 201010620098.2, dated Jul. 28, 2014, 14 pages (including 9 pages of English translation).

Office Action for U.S. Appl. No. 13/738,162, dated Aug. 19, 2014, 38 pages.

Office Action for Japanese Patent Application No. 2014-174006, dated Aug. 4, 2015, 8 pages (including 4 pages of English translation).

Final Office Action for U.S. Appl. No. 13/738,162, dated Aug. 4, 2015, 17 pages.

Office Action for Japanese Patent Application No. 2014-081241, dated Nov. 11, 2014, 10 pages (including 6 pages of English translation).

Office Action for U.S. Appl. No. 13/738,162, dated Mar. 12, 2015, 22 pages.

Office Action for Chinese Patent Application No. 201010620098.2, dated Mar. 23, 2015, 10 pages (including 6 pages of English translation).

Office Action for U.S. Appl. No. 12/642,818, dated Jan. 4, 2012, 16 pages.

Office Action for U.S. Appl. No. 12/642,818, dated May 29, 2014, 42 pages.

Final Office Action for U.S. Appl. No. 12/642,818, dated Oct. 12, 2012, 7 pages.

Office Action for U.S. Appl. No. 12/642,818, dated Oct. 10, 2014, 16 pages.

Office Action for U.S. Appl. No. 14/920,054, dated Jun. 7, 2016, 25 pages.

(56) References Cited

OTHER PUBLICATIONS

Office Action for U.S. Appl. No. 14/920,054, dated Nov. 18, 2016, 11 pages.
Notice of Allowance for U.S. Appl. No. 12/642,818, dated Jun. 3, 2015, 11 pages.
Office Action for U.S. Appl. No. 12/642,818, dated Jun. 8, 2012, 11 pages.
European Search Report for European Patent Application No. 10838091.6 dated Jan. 31, 2017, 9 pages.
European Search Report for European Patent Application No. 16191629.1 dated Jan. 31, 2017, 11 pages.
European Search Report for European Patent Application No. 16191630.9 dated Jan. 31, 2017, 9 pages.
Office Action for U.S. Appl. No. 14/920,054, dated May 19, 2017, 15 pages.
Office Action for Japanese Patent Application No. 2015-240925, dated May 30, 2017, 13 pages (Including 6 pages of English translation).
Adrian Stephens (Intel Corporation), Joint Proposal Mac Specification, IEEE 802.11-05/1095r3, IEEE, Jan. 6, 2006, p. 24-34, 13 pages.
Aon Mujtaba (Agere Systems), TGnSync Proposal Technical Specification, IEEE 802.11-04/0889r44, IEEE, Mar. 2005, 31 pages.
Office Action for Chinese Patent Application No. 201510030188.9, dated Jul. 31, 2017, 20 pages (Including 11 pages of English translation).
Office Action for Chinese Patent Application No. 201510080139.6, dated Aug. 3, 2017, 11 pages (Including 7 pages of English translation).
Office Action for U.S. Appl. No. 15/281,088, dated Dec. 29, 2017, 44 pages.
Notice of Allowance for U.S. Appl. No. 14/920,054, dated Oct. 16, 2017, 11 pages.
Office Action for Chinese Patent Application No. 201510030188.9, dated Apr. 4, 2018, 14 pages.
Office Action for Chinese Patent Application No. 201510080139.6, dated Apr. 11, 2018, 6 pages.
Extended Search Report for European Patent Application No. 21184388.3, dated Aug. 18, 2021, 8 pages.
Office Action for Japanese Patent Application No. 2017-016552, dated Apr. 3, 2018, 6 pages (including 3 pages of English translation).
Satoru Aikawa, Revised Third Edition 802.11 High-Speed Wireless LAN Textbook Original Edition 802.11 High-Speed Wireless LAN Textbook, Impress R&D, Masanobu Iseri, Apr. 11, 2008, First Edition, p. 79, 172, 176.
English translation, received on May 4, 2018, of the Apr. 4, 2018 Office Action for Chinese Patent Application No. 201510030188.9, 15 pages.
English translation, received on May 14, 2018, of the Apr. 11, 2018 Office Action for Chinese Patent Application No. 201510080139.6, 10 pages.
Office Action for U.S. Appl. No. 15/281,088, dated Jul. 13, 2018, 23 pages.
Office Action for Chinese Patent Application No. 201510030188.9, dated Aug. 16, 2018, 23 pages (Including 12 pages of English translation).
Office Action for European Patent Application No. 10843420.0 dated Oct. 16, 2018, 5 pages.
Office Action for U.S. Appl. No. 15/281,088, dated Jan. 7, 2019, 22 pages.
Notice of Allowance for U.S. Appl. No. 15/281,088, dated Apr. 19, 2019, 8 Pages.
Summons to attend oral proceedings in European Patent Application No. 10843420.0, dated May 22, 2019, 6 pages.
Office Action for European Patent Application No. 16191630.9, dated Feb. 4, 2020, 7 pages.
Office Action for U.S. Appl. No. 16/543,923, dated May 29, 2020, 42 pages.
Notice of Allowance for U.S. Appl. No. 16/543,923, dated Oct. 27, 2020, 7 pages.

\* cited by examiner

# DEVICE, SYSTEM AND METHOD OF SIMULTANEOUSLY COMMUNICATING WITH A GROUP OF WIRELESS COMMUNICATION DEVICES

BACKGROUND

A Spatial Division Multiple Access (SDMA) communication scheme may be implemented for communicating between a wireless communication device and a plurality of other wireless communication devices. The wireless communication device may transmit a downlink SDMA transmission by transmitting different signals substantially simultaneously via a combination of antennas. The combined transmitted signals may result in different signals, which are to be received by the plurality of other wireless communication devices, being transmitted substantially in different directions on the same frequency.

The wireless communication device may receive an uplink SDMA transmission including different signals from the plurality of other wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE 802.11-1999: Wireless LAN Medium Access Control (MAC) and Physical Layer (PHY) Specifications*), 802.11a, 802.11b, 802.11g, 802. 11h, 802.11j, 802.11n, 802.11 task group ad (TGad), 802.16, 802.16d, 802.16e, 802.16f, standards and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA`

(E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "substantially simultaneously", as used herein with reference to transmitting to two or more different wireless communication devices and/or receiving from two or more wireless communication devices, may refer to transmitting and/or receiving two or more transmissions, wherein at least a portion of each transmission and/or reception occurs at the same time, but does not imply that the different transmissions and/or receptions must start and/or end at the same time, although they may.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the IEEE 802.11, IEEE 802.11TGad and/or WGA specifications, and the like.

Figure 1:
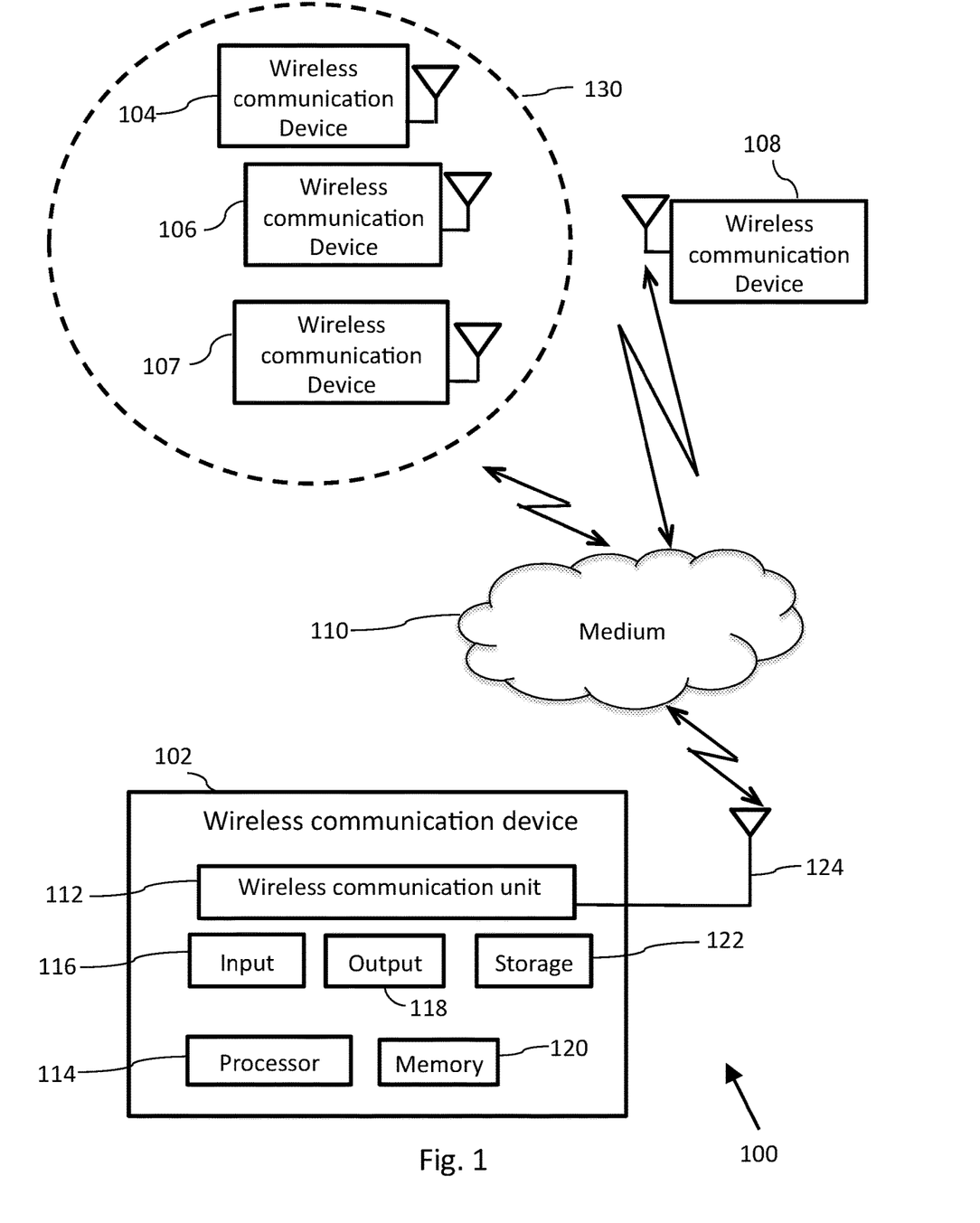
FIG. 1 is a schematic block diagram illustration of a system in accordance with some demonstrative embodiments.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102, 104, 106, 107 and/or 108, capable of communicating content, data, information and/or signals over a wireless communication medium 110, for example, over one or more suitable wireless communication links, e.g., a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 104, 106, 107 and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication device 102 may include a wireless communication unit 112 to perform wireless communication with wireless communication devices 104, 106, 107 and/or 108 with one or more other wireless communication devices, e.g., as described below. Wireless communication device 102 may also include, for example, one or more of a processor 114, an input unit 116, an output unit 118, a memory unit 120, and a storage unit 122. Wireless communication device 102 may optionally include other suitable hardware components and/or software components. In some demonstrative embodiments, some or all of the components of wireless communication device 102 may be enclosed in a common housing or packaging, and may be interconnected or operably associated using one or more wired or wireless links. In other embodiments, components of wireless communication device 102 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102 and/or of one or more suitable applications.

Input unit 116 includes, for example, a keyboard, a keypad, a mouse, a touch-pad, a track-ball, a stylus, a microphone, or other suitable pointing device or input device. Output unit 118 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by wireless communication device 102.

In some demonstrative embodiments, wireless communication unit 112 includes, for example, one or more wireless transmitters, receivers and/or transceivers able to send and/or receive wireless communication signals, RF signals, frames, blocks, transmission streams, packets, messages, data items, and/or data. For example, wireless communication unit 112 may include or may be implemented as part of a wireless Network Interface Card (NIC), and the like.

Wireless communication unit 112 may include, or may be associated with, one or more antennas 124. Antennas 124 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, the wireless communication devices of system 100 may communicate over wireless communication medium 110 according to any suitable access scheme, for example, a suitable contention-based access scheme, e.g., a random-access scheme. For example, system 100 may include a wireless network, e.g., a wireless Local-Area-Network (LAN) communicating over unlicensed frequency bands, which may operate according to a random access scheme, e.g., in order to allow coexistence with one or more other networks without requiring central coordination. The contention-based scheme may include, for example, any suitable Carrier-Sense-Multiple-Access (CSMA) scheme, for example, any suitable CSMA-with-Collision-Avoidance (CSMA/CA) scheme, e.g., according to the IEEE 802.11 standards and/or any other suitable standard.

In some demonstrative embodiments, at least one wireless communication device of system 100, e.g., wireless communication device 102, may perform the functionality of an Access Point (AP), Control Point (CP), Base Station (BS) or any suitable coordinator or controller, e.g., as defined by the IEEE 802.11 and/or WGA specifications.

In some demonstrative embodiments, wireless communication unit 112 may be capable of simultaneously transmitting transmissions to two or more other devices of system 100 and/or simultaneously receiving transmissions from two or more other devices of system 100.

In some embodiments, wireless communication unit 112 may be capable of performing Spatial Division Multiple Access (SDMA) communication. For example, wireless communication unit 112 may transmit a downlink SDMA transmission by transmitting different signals substantially simultaneously via antennas 124, such that the combined transmitted signals result in different signals, which are intended to be received by two or more other wireless communication devices of system 100, being transmitted substantially in different directions on the same frequency.

In some demonstrative embodiments, wireless communication unit 112 may receive an uplink SDMA transmission including different signals from two or more other devices of system 100.

In some demonstrative embodiments, wireless communication unit 112 may communicate over medium 110 with at least one group 130 of a plurality of wireless communication devices of system 100, e.g., as described in detail below.

In some demonstrative embodiments, group 130 may include a plurality of wireless communication devices, e.g., wireless communication devices 104, 106 and/or 107, which may be suitable for simultaneous downlink and/or uplink wireless communication with wireless communication unit 112. For example, group 130 may include a SDMA group of devices suitable for unidirectional, e.g., in an uplink direction to device 102 and/or a downlink direction from device 102, and/or bidirectional communication with wireless communication unit 112, e.g., as described below.

In some demonstrative embodiments, the wireless communication devices of group 130 may be grouped together, e.g., by wireless communication unit 112, according to any suitable criteria, for example, one or more traffic-specification (TSPEC) requirements, e.g., quality of service requirements, bandwidth requirements, traffic pattern requirements, and the like, and/or any other suitable requirement and/or parameter.

In some demonstrative embodiments, wireless communication unit 112 may be capable of receiving the TSPEC information corresponding to wireless communication devices 104, 106 and/or 107 as a part of an Add Traffic Stream (ADDTS) Request frame. The ADDTS frame received from a wireless communication device may include a suitable TSPEC Information Element (IE) and/or field, which may include the TSPEC information corresponding to the wireless communication device. In other embodiments, wireless communication unit 112 may receive the TSPEC information as part of any other suitable frame and/or communication and/or in any other suitable format.

In some demonstrative embodiments, the TSPEC information corresponding to a wireless communication device, as received by wireless communication unit 112, may include traffic flow information defining a traffic flow between the wireless communication device and wireless communication unit 112. The TSPEC information corresponding to the wireless communication device may include, for example, one or more of a traffic pattern of the traffic flow, a Quality of Service (QoS) of the traffic flow, and/or any other series of requirements, parameters, characteristics and/or expectations of a traffic flow. For example, wireless communication unit 112 may receive a first ADDTS frame from wireless communication device 104, including traffic flow information, e.g., a traffic pattern and/or a QoS, defining a traffic flow between wireless communication device 104 and wireless communication unit 112; a second ADDTS frame from wireless communication device 106, including traffic flow information, e.g., a traffic pattern and/or a QoS, defining a traffic flow between wireless communication device 106 and wireless communication unit 112; and/or a third ADDTS frame from wireless communication device 107, including traffic flow information, e.g., a traffic pattern and/or a QoS, defining a traffic flow between wireless communication device 107 and wireless communication unit 112.

In some demonstrative embodiments, the TSPEC information, received by wireless communication unit 112 from a wireless communication device, may include a directionality of the traffic flow between the wireless communication device and wireless communication unit 112. The directionality of the traffic flow may be determined, for example, based on the traffic pattern of the traffic flow. For example, the directionality of the traffic flow may include an uplink traffic flow, e.g., including uplink transmissions from the wireless communication device to wireless communication unit 112; a downlink traffic flow, e.g., including downlink transmissions from wireless communication unit 112 to the wireless communication device; or a bidirectional traffic flow, e.g., including both uplink transmissions and downlink transmissions.

In some demonstrative embodiments, the QoS of the traffic flow may include, for example, a QoS parameter representing, for example, a priority type of the traffic flow, e.g., guaranteeing a certain level of performance. The priority type of the traffic flow may be selected, for example, from a set of predefined priority types. In one example, the QoS of the traffic flow may be selected from a set of four predefined priority types, for example, a video priority type, an audio (voice) priority type, a best effort priority type, and a background priority type, e.g., as defined by the 802.11 standard and/or any other suitable standard.

In some demonstrative embodiments, the traffic flow corresponding to a wireless communication device may be categorized as an isochronous traffic flow, for example, if the traffic flow includes a time-dependent traffic flow, e.g., including video and/or voice data; and/or as an asynchronous traffic flow, for example, if the traffic flow is not time-dependent, e.g., if the traffic flow does not include video or voice data.

In some demonstrative embodiments, wireless communication unit 112 may assign wireless communication devices 104, 106 and/or 107 to one or more groups, e.g., including group 130, based on the categorization and/or directionality of the traffic flows corresponding to wireless communication devices 104, 106 and/or 107.

In some demonstrative embodiments, wireless communication unit 112 may assign wireless communication devices 104, 106 and/or 107 to an uplink isochronous group, a downlink isochronous group, a bidirectional isochronous group, and/or a bi-directional asynchronous group. In other embodiments, wireless communication unit 112 may assign wireless communication devices 104, 106 and/or 107 to any other suitable group.

In some demonstrative embodiments, wireless communication unit 112 may assign a wireless communication device of devices 104, 106 and 107 to the uplink isochronous group, for example, if the TSPEC information corresponding to the wireless communication device represents an uplink traffic pattern including at least one of video and voice data; wireless communication unit 112 may assign the wireless communication device to the downlink isochronous group if the TSPEC information corresponding to the wireless communication device represents a downlink traffic pattern including at least one of video and voice data; wireless communication unit 112 may assign the wireless communication device to the bi-directional isochronous group if the TSPEC information corresponding to the wireless communication device represents a bidirectional traffic pattern including at least one of video and voice data; and/or wireless communication unit 112 may assign the wireless communication device to the bi-directional asynchronous group if the TSPEC information corresponding to the wireless communication device represents another traffic pattern.

Although some embodiments are described herein with reference to assigning a wireless communication device to a group based on the TSPEC information corresponding to the wireless communication device, other embodiments may include one or more wireless communication devices assigned to a group based on any other suitable criteria.

In some demonstrative embodiments, wireless communication unit 112 may assign wireless communication devices 104, 106 and 107 to group 130, and provide to wireless communication devices 104, 106 and/or 107 suitable group allocation information defining group 130 and/or relating to group 130.

In some demonstrative embodiments, wireless communication unit 112 may assign to group 130 a wireless communication address (also referred to as "group address" or "multicast address"). The group address assigned to group 130 may include, for example, a suitable Media-Access-Control (MAC) address, which may be assigned uniquely, e.g., within system 100 and/or a Basic-Service-Set (BSS) controlled and/or managed by wireless communication unit 112.

In some demonstrative embodiments, wireless communication unit 112 may inform wireless communication devices 104, 106 and/or 107 of the group address assigned to group 130, for example, using any suitable transmission, frame and/or packet. For example, wireless communication unit 112 may transmit one or more unicast frames to wireless communication devices 104, 106 and/or 107, e.g., a first group allocation frame addressed to wireless communication device 104, a second group allocation frame addressed to wireless communication device 106 and/or a third group allocation frame addressed to wireless communication device 107. The first, second and third group allocation frames may include, for example, the group address of group 130.

In some demonstrative embodiments, wireless communication unit 112 may determine, e.g., based on any suitable criteria, an order at which wireless communication devices 104, 106 and/or 107 are to respond to a transmission from wireless communication unit 112, for example, such that wireless communication devices 104, 106 and 107 may respond during non-overlapping time periods, e.g., as described below. For example, wireless communication unit 112 may determine that wireless communication device 106 is to respond to the transmission from wireless communication unit 112 a first offset time after the transmission from wireless communication unit 112, that wireless communication device 104 is to respond to the transmission from wireless communication unit 112 a second offset time, which is longer than the first offset time after the transmission, and/or that wireless communication device 107 is to respond to the transmission from wireless communication unit 112 a third offset time, which is longer than the second offset time after the transmission. A difference between the second and first offset times and/or difference between the third and second offset times may be at least equal to a duration of the responses from wireless communication devices 104 and/or 106, e.g., to allow wireless communication devices 104, 106 and 107 to respond during non-overlapping periods.

In some demonstrative embodiments, wireless communication unit 112 may include an indication of the required order, e.g., in the group allocation frame. For example, the group allocation frame may include values, for example in the form of suitable Association Identifiers (AIDs) and/or suitable MAC addresses, representing wireless communication devices 104, 106 and 107 according to the required order. For example, the group allocation frame may include a value representing the MAC address of wireless communication device 106 followed by a value representing the MAC address of wireless communication device 104, which in turn may be followed by a value representing the MAC address of wireless communication device 107, e.g., if wireless communication device 106 is to respond to wireless communication unit 112 prior to a response from wireless communication device 104, which in turn is to respond to wireless communication unit 112 prior to a response from wireless communication device 107.

In some demonstrative embodiments, wireless communication devices 104, 106 and/or 107 may each determine the order at which to respond to wireless communication unit 112, based on the indication of the required order.

In some embodiments, wireless communication devices 104, 106 and/or 107 may transmit the responses at a data rate equal to a data rate of the transmission from wireless communication unit 112, e.g., in order to allow wireless communication devices 104, 106 and/or 107 to schedule the transmission of the responses, such that wireless communication device 112 may be able to receive the responses.

In another embodiment, wireless communication units 104, 106 and/or 107 may transmit the responses at a selected predefined data rate for communication with wireless communication unit 112. In one example, wireless communication units 104, 106 and/or 107 may transmit the responses at a data rate, which is selected from a predefined set of data rates implemented for communication in system 100, e.g., the BSSBasicRateSet as defined by the 802.11 standards. For example, wireless communication units 104, 106 and/or 107 may transmit the responses at a highest data rate of the BSSBasicRateSet, which is less than or equal to a rate of an immediately previous frame received from wireless communication unit 112.

In some demonstrative embodiments, wireless communication unit 112 may assign wireless communication devices 104, 106 and/or 107 to group 130, for example, while not directly providing wireless communication units 104, 106 and/or 107 with information defining group 130 and/or relating to group 130. According to this example, wireless communication unit 112 may simultaneously transmit downlink transmissions to devices of group 130, e.g., while one or more of the wireless communication devices of group 130 may not be aware of the simultaneous transmission to other devices in group 130, for example, if the one or more wireless communication devices are not required to and/or is not able to transmit uplink SDMA transmissions to wireless communication unit 112. For example, wireless communication unit 112 may transmit a downlink SDMA transmission to a wireless communication device, e.g., device 107, while the wireless communication device may not be aware of the fact that the downlink transmission is a downlink SDMA transmission, for example, if wireless communication device 107 is not required to and/or is not able to transmit uplink SDMA transmissions to wireless communication unit 112.

In some demonstrative embodiments, wireless communication unit 112 may reserve wireless communication medium 110 for a time period, during which wireless communication unit 112 is to simultaneously transmit two or more different wireless communication transmissions to two or more wireless communication devices of group 130, respectively, e.g., as described in detail below.

Figure 2:
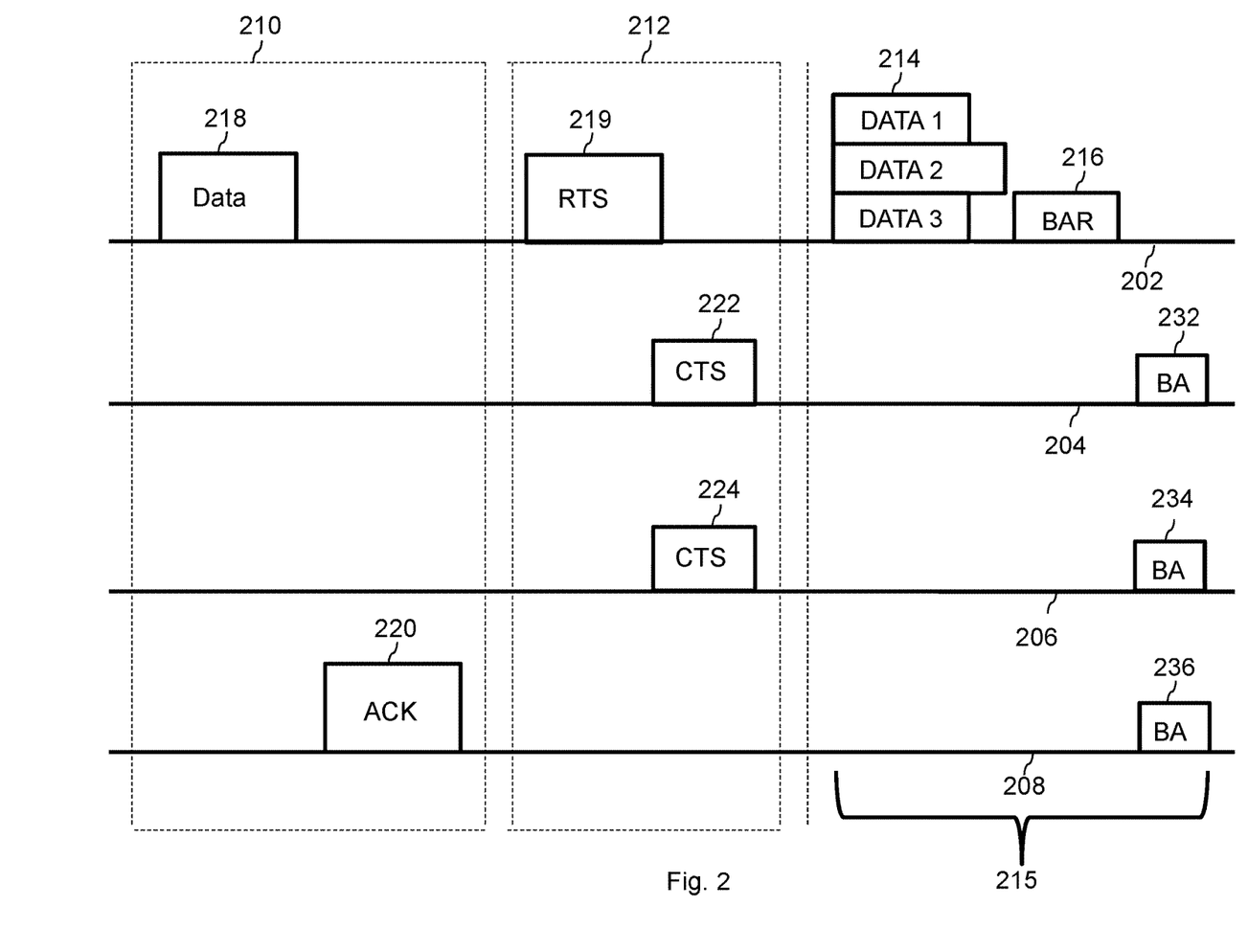
FIG. 2 is a schematic illustration of a sequence of transmissions between a wireless communication device and a group of other wireless communication devices, in accordance with some demonstrative embodiments.

Reference is also made to FIG. 2, which schematically illustrates a sequence of transmissions between a wireless communication device, e.g., wireless communication device 102 (FIG. 1) and/or wireless communication unit 112 (FIG. 1), and a group of other wireless communication devices, e.g., group 130 (FIG. 1), in accordance with some demonstrative embodiments.

As shown in FIG. 2, a timeline 202 includes transmissions by the wireless communication device, e.g., wireless communication unit 112 (FIG. 1); a timeline 204 includes transmissions by a first wireless communication device of the group, e.g., wireless communication device 104 (FIG. 1); a timeline 206 includes transmissions by a second wireless communication device of the group, e.g., wireless communication device 106 (FIG. 1); and a timeline 208 includes transmissions by a third wireless communication device of the group, e.g., wireless communication device 107 (FIG. 1).

In some demonstrative embodiments, wireless communication unit 112 (FIG. 1) may reserve wireless communication medium 110 (FIG. 1) for at least a time period 215, during which wireless communication unit 112 (FIG. 1) is to simultaneously transmit two or more different wireless communication transmissions 214 to two or more wireless communication devices of group 130, respectively.

In some demonstrative embodiments, transmissions 214 may be transmitted as part of a SDMA transmission including three, e.g., different, data packets, denoted data1, data2, and data3, e.g., three aggregate MAC protocol data unit (AMPDUs), to be received by wireless communication devices 104, 106 and/or 107, respectively. In one example, the three data packets data1, data2, and data3 may include data packets of different lengths. According to this example, the reserved duration 215 may correspond to at least the length of the longest data packet.

In some demonstrative embodiments, reserved time period 215 may include at least the transmission duration of transmissions 214 and/or any one or more uplink and/or downlink transmissions associated with transmissions 214, for example, one or more uplink and/or downlink transmissions to confirm and/or acknowledge receipt of transmissions 214, e.g., as described below.

In some demonstrative embodiments, wireless communication unit 112 (FIG. 1) may reserve medium 110 (FIG. 1) according to a first reservation scheme 212 by transmitting at least one Request-To-Send (RTS) packet 219 to one or more wireless communication devices of group 130 (FIG. 1). The RTS packet 219 may include a duration value corresponding to the time period to be reserved 215. For example, a duration filed of RTS packet 219 may be set by wireless communication unit 112 (FIG. 1) to include a value corresponding to the time period to be reserved 215.

In some demonstrative embodiments, wireless communication unit 112 (FIG. 1) may transmit RTS packet 219 addressed to the wireless communication devices of group 130 (FIG. 1). For example, wireless communication unit 112 (FIG. 1) may transmit RTS packet 219 including the group address assigned to group 130, for example, after informing wireless communication devices 104, 106 and/or 107 of the group address, e.g., as described above.

In some demonstrative embodiments, wireless communication unit 112 (FIG. 1) may receive one or more clear-to-send (CTS) packets from one or more wireless communication devices of group 130 (FIG. 1), e.g., in response to RTS packet 219. For example, wireless communication unit 112 (FIG. 1) may receive a first CTS packet 222 from wireless communication device 104 (FIG. 1) and a second CTS packet 224 from wireless communication device 106 (FIG. 1). As shown in FIG. 2, in one example, wireless communication unit 112 (FIG. 1) may not receive a CTS packet from one or more devices of group 130 (FIG. 1), e.g., from wireless communication device 107 (FIG. 1), e.g., due to a collision, interference and/or any other reason.

As shown in FIG. 2, in some demonstrative embodiments CTS packets 222 and 224 may be transmitted by wireless communication devices 104 and 106 (FIG. 1) substantially simultaneously and/or CTS packets 222 and 224 may be received substantially simultaneously by wireless communication unit 112 (FIG. 1), for example, if wireless communication devices 104 and/or 106 support uplink SDMA transmissions.

In some demonstrative embodiments, CTS packets 222 and 224 may be identical to one another. For example, both wireless communication devices 104 and 106 may generate CTS packets 222 and 224, respectively, using a common scrambling seed, e.g., the scrambling seed of RTS packet 219.

In some demonstrative embodiments, wireless communication unit 112 (FIG. 1) may receive and decode CTS packets 222 and 224. A wireless communication device of system 100 (FIG. 1) not belonging to group 130 (FIG. 1), e.g., wireless communication device 108 (FIG. 1), may receive CTS packets 222 and/or 224. Since CTS packets 222 and 224 may be identical to one another, the wireless communication device may decode CTS packets 222 and 224, e.g., assuming packets 222 and 224 have resulted from a multi-path effect.

In some demonstrative embodiments, another wireless communication device of system 100 (FIG. 1) receiving CTS packets 222 and/or 224, for example, a wireless communication device of group 130 (FIG. 1), e.g., wireless communication device 107, and/or a wireless communication device not included in group 130 (FIG. 1), e.g., wireless communication device 108 (FIG. 1), may avoid performing transmissions over wireless communication medium 110 (FIG. 1) during reserved time period 215.

In some demonstrative embodiments, wireless communication unit 112 (FIG. 1) may simultaneously transmit transmissions 214 to two or more wireless communication devices ("the two or more addressed devices") of group 130. The two or more addressed devices may include two or more wireless communication devices of group 130 (FIG. 1) from which wireless communication unit 112 (FIG. 1) has received two or more CTS packets, respectively. For example, if wireless communication unit 112 (FIG. 1) receives CTS packets 222 and 224, then wireless communication unit 112 (FIG. 1) may transmit transmission 214 including the data packets data1 and data2 intended for wireless communication devices 104 and 106 (FIG. 1), respectively, e.g., while not including the data packet data3 intended for wireless communication device 107 (FIG. 1), from which a CTS packet has not been received by wireless communication unit 112 (FIG. 1).

In some demonstrative embodiments, wireless communication unit 112 (FIG. 1) may reserve medium 110 (FIG. 1) according to a second reservation scheme 210 by transmitting a data packet 218, including a duration value corresponding to the time period to be reserved 215, to at least one of the wireless communication devices of group 130, e.g., to wireless communication device 107 (FIG. 1). For example, a duration filed of data packet 218 may be set by wireless communication unit 112 (FIG. 1) to include a value corresponding to the time period to be reserved 215. Wireless communication device 107 (FIG. 1) may respond with a suitable acknowledgment (ACK) packet 220. As a result, another wireless communication device of system 100 (FIG. 1) receiving data packet 218 and/or ACK 220, for example, a wireless communication device of group 130 (FIG. 1), e.g., wireless communication devices 104 and/or 106, and/or a wireless communication device not included in group 130 (FIG. 1), e.g., wireless communication device 108 (FIG. 1), may avoid performing transmissions over wireless communication medium 110 (FIG. 1) during reserved time period 215.

In some demonstrative embodiments, wireless communication unit 112 (FIG. 1) may simultaneously transmit transmissions 214 to the two or more addressed wireless communication devices of group 130 (FIG. 1). For example, wireless communication unit 112 (FIG. 1) may transmit transmission 214 including the simultaneous transmission of data packets data1, data2 and data3 to wireless communication devices 104, 106 and 107 (FIG. 1), respectively.

In some demonstrative embodiments, wireless communication unit 112 (FIG. 1) may transmit at least one block-acknowledgement-request (BAR) 216 to the two or more addressed devices. In one embodiment, wireless communication unit 112 (FIG. 1) may simultaneously transmit BAR 216 as part of a downlink SDMA transmission to the two or more addressed devices. In other embodiments, wireless communication unit 112 (FIG. 1) may transmit BAR 216 as part of two or more separate unicast transmissions to the two or more addressed devices, respectively.

In some demonstrative embodiments, wireless communication unit 112 (FIG. 1) may receive from the two or more addressed devices two or more respective block-acknowledgments (BAs). For example, wireless communication unit 112 (FIG. 1) may transmit BAR 216 as part of a downlink SDMA transmission to wireless communication devices 104, 106 and/or 107 (FIG. 1) and, in response, wireless communication unit 112 (FIG. 1) may receive BA 232 from wireless communication unit 104 (FIG. 1), BA 234 from wireless communication unit 106 (FIG. 1) and/or BA 236 from wireless communication unit 107 (FIG. 1).

As shown in FIG. 2, wireless communication devices 104, 106 and/or 107 (FIG. 1) may be capable of performing uplink SDMA transmissions. For example, as shown in FIG. 2, CTS packets 222 and 224 may be transmitted by wireless communication devices 104 and 106 (FIG. 1) substantially simultaneously; CTS packets 222 and 224 may be received substantially simultaneously by wireless communication unit 112 (FIG. 1); BA 232, BA 234 and 236 may be transmitted by wireless communication devices 104, 106 and 107 (FIG. 1), respectively, substantially simultaneously; and/or BA 232 and 234 may be received by wireless communication unit 112 (FIG. 1) substantially simultaneously. However, in other embodiments, uplink transmissions from wireless communication devices 104, 106 and/or 107 (FIG. 1) may be performed sequentially, e.g., as described below.

In some demonstrative embodiments, wireless communication unit 112 (FIG. 1) may determine the order ("the response order") at which wireless communication devices 104, 106 and/or 107 (FIG. 1) are to respond to transmissions from wireless communication unit 112 (FIG. 1), for example, if wireless communication devices 104, 106 and/or 107 (FIG. 1) do not support SDMA uplink transmissions. Wireless communication unit 112 (FIG. 1) may inform wireless communication devices 104, 106 and/or 107 (FIG. 1) of the response order, e.g., using the group allocation frame, as described above. In other embodiments, the response order at which wireless communication devices 104, 106 and/or 107 (FIG. 1) are to respond to transmissions from wireless communication unit 112 (FIG. 1) may be determined and/or provided to wireless communication devices 104, 106 and/or 107 (FIG. 1) according to any other suitable criterion and/or scheme.

In some demonstrative embodiments, wireless communication units 104 and/or 106 (FIG. 1) may transmit respective CTS packets 222 and 224 sequentially and/or wireless communication units 104, 106 and/or 107 (FIG. 1) may transmit respective BA packets 232, 234 and 236 sequentially, e.g., according to the response order. For example, wireless communication unit 112 (FIG. 1) may allocate a first response period to wireless communication device 104 (FIG. 1), and a second response period, succeeding the first period, to wireless communication device 106, for transmitting CTS packets 222 and 224, respectively. For example, the beginning of the second response period may be delayed, with respect to the beginning of the first response period, by the combined duration of a CTS packet transmission and a short-inter-frame-space (SIFS) period, and/or any other time period. Accordingly, wireless communication device 104 (FIG. 1) may transmit CTS packet 222 during the first response period, and wireless communication device 106 (FIG. 1) may transmit CTS packet 224 during the second time period, such that the transmissions of CTS packets 222 and 224 do not overlap. Similarly, if the response order defines wireless communication device 107 (FIG. 1) is to respond after wireless communication device 106 (FIG. 1), which in turn is to respond after wireless communication unit 104 (FIG. 1), then wireless communication unit 106 (FIG. 1) may begin the transmission of BA 234 at a BA delay, e.g., equal to the combined duration of a BA transmission and a SIFS, after the beginning of the transmission of BA 232; and/or wireless communication unit 107 (FIG. 1) may begin the transmission of BA 236 at the BA after the beginning of the transmission of BA 234. Accordingly, wireless communication devices 104, 106 and/or 107 (FIG. 1) may sequentially transmit BAs 232, 234 and/or 236, respectively, such that the transmissions of BAs 232, 234 and 236 do not overlap.

In some demonstrative embodiments, wireless communication unit 112 (FIG. 1) may include in one or more of transmissions 214, e.g., in each of transmissions 214, an indication of the duration of a longest transmission of transmissions 214. For example, wireless communication unit 112 (FIG. 1) may include in each of data packets data1, data2, and data 3 an indication of the duration of a longest one of data packets data1, data2, and data 3. In one example, transmissions 214 include AMPDUs, and wireless communication unit 112 (FIG. 1) may include an indication of the duration of the longest AMPDU in each one of the AMPDUs, e.g., in the L-SIG field. Accordingly, each of wireless communication devices 104, 106 and 107 (FIG. 1) may determine when transmissions 214 are to end. At the end of transmissions 214, wireless communication devices 104, 106 and/or 107 (FIG. 1) may transmit BAs 232, 234 and/or 236, respectively, e.g., without having to receive BAR 216. Wireless communication devices 104, 106 and/or 107 (FIG. 1) may transmit BAs 232, 234 and/or 236, respectively, in a simultaneous manner, e.g., if uplink SDMA is supported, or sequentially, e.g., if uplink SDMA is not supported, e.g., as discussed above.

In some demonstrative embodiments, wireless communication unit 112 (FIG. 1) may transmit RTS packet 219 in the form of an Extended RTS (ERTS) intended for only some wireless communication devices ("the selected devices") of group 130 (FIG. 1), e.g., to which wireless communication unit 112 (FIG. 1) has buffered traffic. The ERTS packet may also indicate the response order of the selected devices. Accordingly, wireless communication unit 112 (FIG. 1) may receive CTS packets from only the selected devices, e.g., according to the response order, and transmit transmissions 214 to the intended devices. Wireless communication unit 112 (FIG. 1) may transmit an Extended BAR (EBAR) to schedule BA transmissions from only the selected devices.

Referring back to FIG. 1, in some demonstrative embodiments, wireless communication unit 112 may determine a beamforming (BF) scheme for communicating with devices 104, 106 and/or 107 by performing a beamforming training sequence including an exchange of at least one simultaneous transmission with two or more devices 104, 106 and 107. The beamforming training sequence may include an implicit beamforming sequence and/or an explicit beamforming sequence, e.g., as described below.

Figure 3:
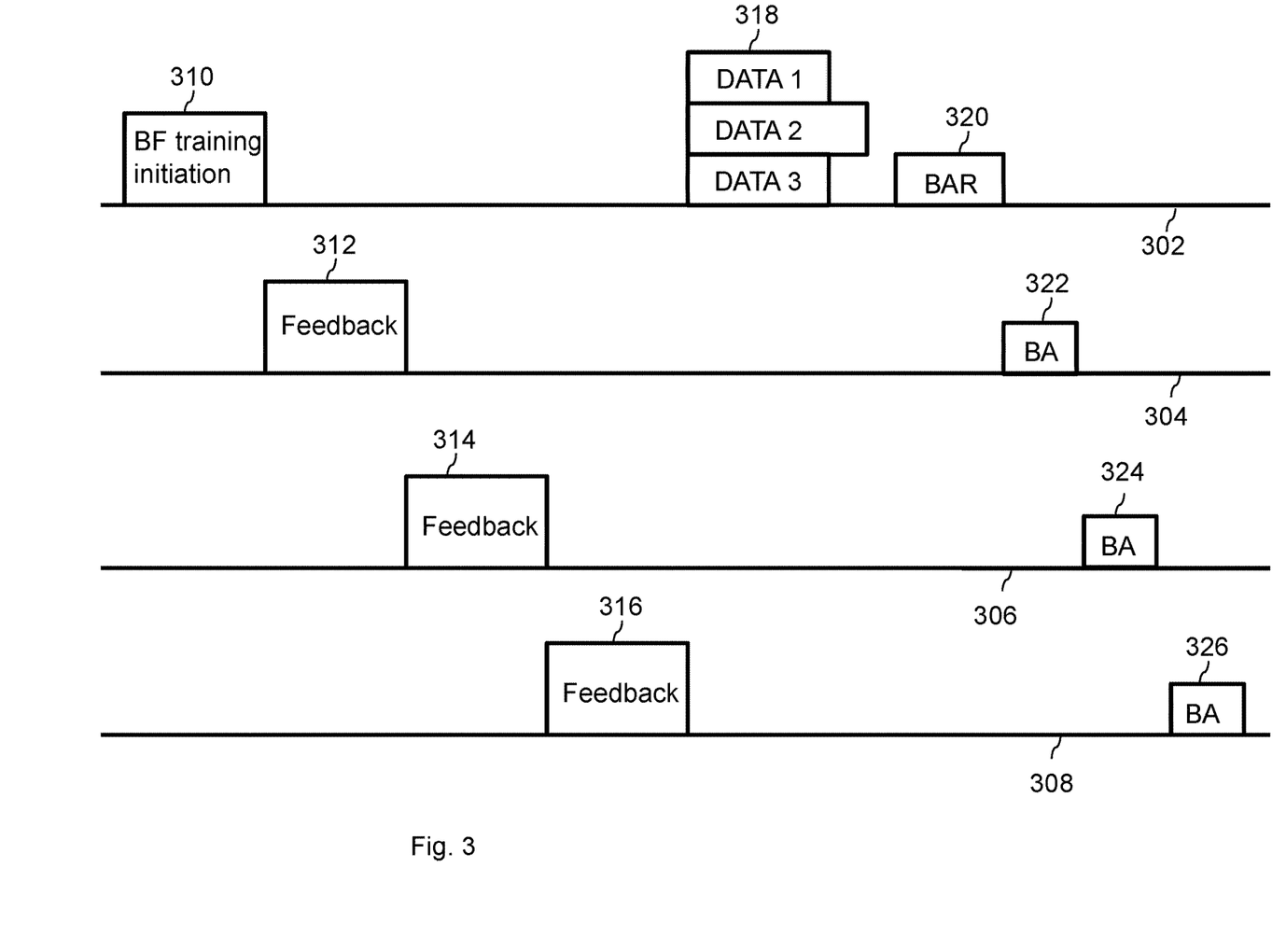
FIG. 3 is a schematic illustration of another sequence of transmissions between a wireless communication device and a group of other wireless communication devices, in accordance with some demonstrative embodiments.

Reference is also made to FIG. 3, which schematically illustrates another sequence of transmissions between a wireless communication device, e.g., wireless communication device 102 (FIG. 1) and/or wireless communication unit 112 (FIG. 1), and a group of other wireless communication devices, e.g., group 130 (FIG. 1), in accordance with some demonstrative embodiments.

As shown in FIG. 3, a timeline 302 includes transmissions by the wireless communication device, e.g., wireless communication unit 112 (FIG. 1); a timeline 304 includes transmissions by a first wireless communication device of the group, e.g., wireless communication device 104 (FIG. 1); a timeline 306 includes transmissions by a second wireless communication device of the group, e.g., wireless communication device 106 (FIG. 1); and a timeline 308 includes transmissions by a third wireless communication device of the group, e.g., wireless communication device 107 (FIG. 1).

In some demonstrative embodiments, wireless communication unit 112 (FIG. 1) may transmit at least one beamforming-training initiation frame 310 to two or more wireless communication devices of group 130 (FIG. 1). Wireless communication unit 112 (FIG. 1) may receive two or more feedback frames from the two or more wireless communication devices. For example, wireless communication unit 112 (FIG. 1) may receive feedback frames 312, 314 and/or 316 from wireless communication devices 104, 106 and/or 107 (FIG. 1), respectively.

In some demonstrative embodiments, wireless communication unit 112 (FIG. 1) may determine two or more beamforming schemes based on the two or more feedback frames. For example, wireless communication unit 112 (FIG. 1) may implement any suitable beamforming training and/or detection method to determine the beamforming schemes to be used for communicating with wireless communication devices 104, 106 and/or 107 (FIG. 1) based on feedback frames 312, 314 and/or 316, respectively.

In some demonstrative embodiments, initiation frame 310 and feedback frames 312, 314 and/or 316 may be exchanged as part of an implicit beamforming training sequence. For example, initiation frame 310 may include a Training Request (TRQ, also referred to as a sounding request) and/or feedback frames 312, 314 and/or 316 may include suitable channel sounding frames. In one embodiment, initiation frame 310 may include any suitable management, control and/or data frame, which may include a TRQ bit set to a predefined value, e.g., one, indicating that initiation frame 310 is to be treated as a TRQ.

In some demonstrative embodiments, initiation frame 310 and feedback frames 312, 314 and/or 316 may be exchanged as part of an explicit beamforming training sequence. For example, initiation frame 310 may include a suitable channel sounding frame and/or feedback frames 312, 314 and/or 316 may include beamforming feedback frames in response to the sounding frame.

In some demonstrative embodiments, wireless communication unit 112 (FIG. 1) may transmit initiation frame 310 including the group address assigned to group 130 (FIG. 1), e.g., as described above. Initiation frame 310 may be transmitted in the form of an extended frame, e.g., an Extended TRQ (ETRQ), including the response order assigned to the wireless communication devices of group 130 (FIG. 1), e.g., as described above, for example, to inform wireless communication devices 104, 106 and/or 107 (FIG. 1) of an order at which feedback frames 312, 314 and/or 316 are to be transmitted sequentially. Wireless communication devices 104, 106 and/or 107 (FIG. 1) may respond to initiation frame 310 by sending feedback frames 312, 314 and/or 316 including suitable sounding frames.

In some demonstrative embodiments, wireless communication unit 112 (FIG. 1) may transmit an individual initiation frame 310 to each of wireless communication devices 104, 106 and/or 107 (FIG. 1), e.g., as part of a unicast transmission.

In some demonstrative embodiments, wireless communication unit 112 (FIG. 1) may transmit two or more different wireless communication transmissions 318 to the two or more wireless communication devices, respectively, using the two or more beamforming schemes, respectively. For example, wireless communication unit 112 (FIG. 1) may transmit transmissions 318 as part of a SDMA scheme, e.g., as described above. In one example, wireless communication unit 112 (FIG. 1) may transmit a BAR 320 following transmissions 318 and/or receive BAs 322, 324 and/or 326 in response to BAR 320, e.g., as described above.

Figure 4:
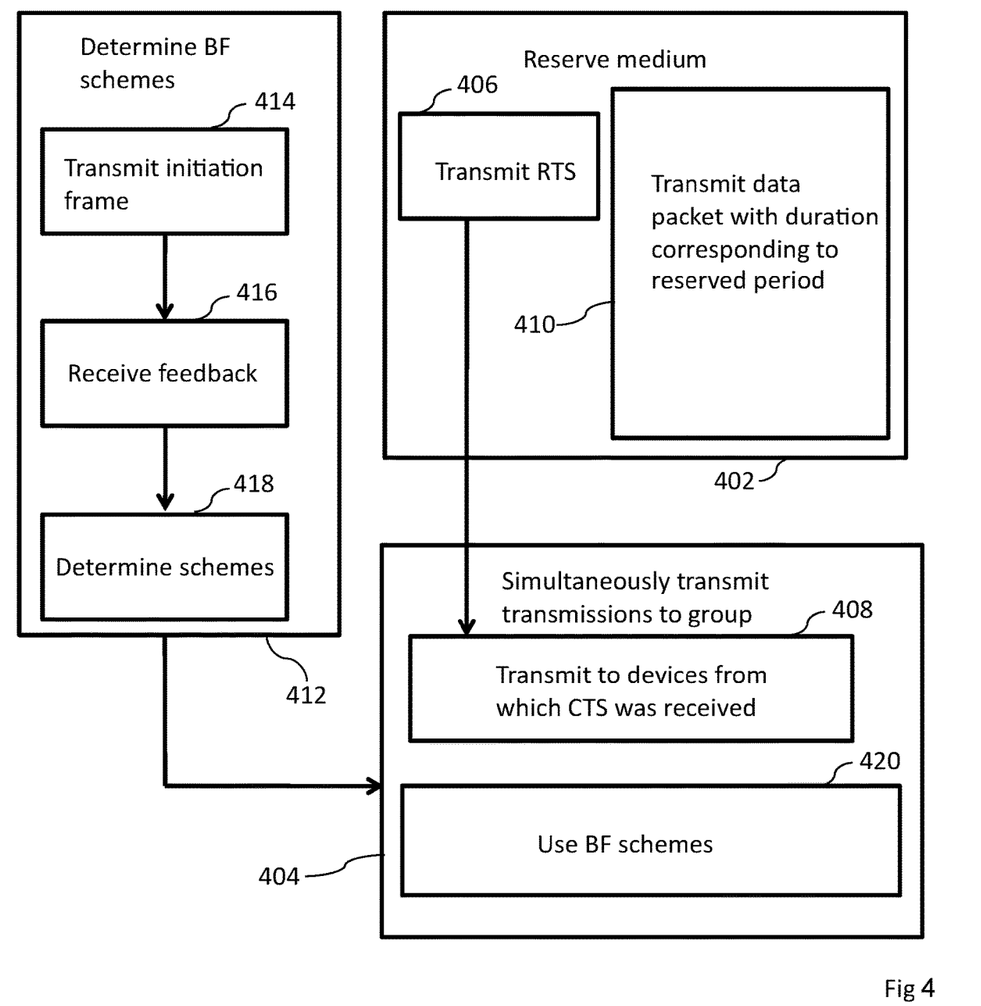
FIG. 4 is a schematic flow-chart illustration of a method of simultaneously communicating with a group of wireless communication devices, in accordance with some demonstrative embodiments.

Reference is made to FIG. 4, which schematically illustrates a method of simultaneously communicating with a group of wireless communication devices, in accordance with some demonstrative embodiments. In some embodiments, one or more operations of the method of FIG. 4 may be performed by system 100 (FIG. 1) and/or one or more of devices 102, 104, 106, 107 and/or 108 (FIG. 1).

As indicated at block 402, the method may include reserving, by a wireless communication unit, a wireless communication medium for a time period. For example, wireless communication unit 112 (FIG. 1) may reserve wireless communication medium 110 (FIG. 1), e.g., as described above.

As indicated at block 406, in some embodiments reserving the wireless communication medium may include transmitting at least one RTS packet to one or more wireless communication devices of the group, wherein the request-to-send packet includes a duration value corresponding to the time period to be reserved. For example, wireless communication unit 112 (FIG. 1) may transmit RTS packet 219 (FIG. 2), e.g., as described above. The RTS packet may include the group address assigned to the group of wireless communication devices, e.g., as described above.

As indicated at block 408, the method may include transmitting the transmissions to the two or more wireless communication devices after receiving two or more CTS packets from the two or more wireless communication devices, in response to the request-to-send packet. For example, wireless communication unit 112 (FIG. 1) may transmit transmissions 214 (FIG. 2) after receiving CTS packets 222 and 224 (FIG. 2), e.g., as described above. The two or more CTS packets may be identical, e.g., as described above.

As indicated at block 410, in some embodiments reserving the wireless communication medium may include transmitting a data packet to at least one of the wireless communication devices of the group, wherein the packet includes a duration value corresponding to the time period to be reserved. For example, wireless communication unit 112 (FIG. 1) may transmit packet 218 (FIG. 2), e.g., as described above.

As indicated at block 404, the method may include simultaneously transmitting, during the reserved time period, two or more different wireless communication transmissions from the wireless communication unit to two or more respective wireless communication devices of a group of a plurality of wireless communication devices. For example, wireless communication unit 112 (FIG. 1) may transmit transmissions 214 (FIG. 2) to two or more wireless communication devices of group 130 (FIG. 1) during the reserved time period, e.g., as described above.

As indicated at block 412, in some embodiments the method may include determining a beamforming scheme for communicating with the wireless communication devices of the group.

As indicated at block 414, the method may include transmitting at least one beamforming-training initiation frame from the wireless communication unit to the group of wireless communication devices. For example, wireless communication unit 112 (FIG. 1) may transmit frame 310 (FIG. 3), e.g., as described above.

As indicated at block 416, the method may include receiving at the wireless communication unit two or more feedback frames from the two or more wireless communication devices. For example, wireless communication unit 112 (FIG. 1) may receive frames 312, 314 and/or 316 (FIG. 3), e.g., as described above.

As indicated at block 418, the method may include determining two or more beamforming schemes based on the two or more feedback frames. For example, wireless communication unit 112 (FIG. 1) may determine the beamforming schemes to be used for communicating with wireless communication devices 104, 106 and/or 107 (FIG. 1) based on frames 312, 314 and/or 316 (FIG. 3), respectively, e.g., as described above.

As indicated at block 420, the method may include transmitting the two or more different wireless communication transmissions to the two or more wireless communication devices, respectively, using the two or more beamforming schemes, respectively. For example, wireless communication unit 112 (FIG. 1) may transmit transmissions 318 (FIG. 3) using the beamforming schemes corresponding to wireless communication devices 104, 106 and/or 107 (FIG. 1), e.g., as described above.

Figure 5:
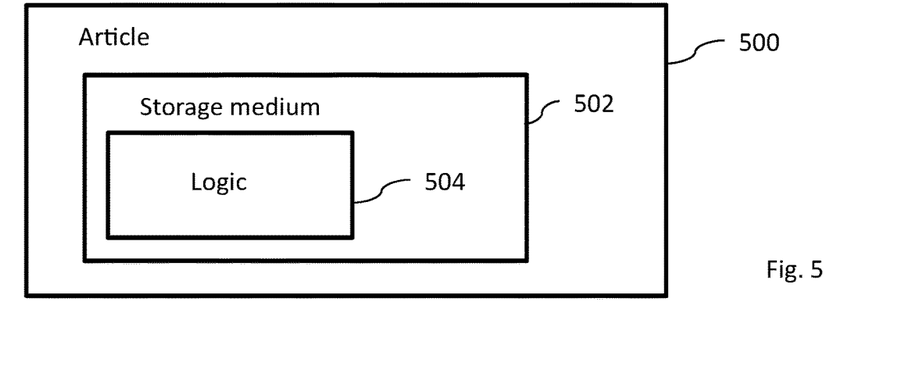
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of wireless communication unit 112 (FIG. 1) and/or to perform one or more operations of the method of FIG. 4.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a memory; and
a processor configured to cause an Access Point (AP) to:
transmit a Request to Send (RTS) configured to reserve a wireless communication medium for a reserved time period for communication between the AP and a plurality of wireless communication stations;
process a plurality of simultaneous Clear to Send (CTS) responses from the plurality of wireless communication stations, the plurality of simultaneous CTS responses received after the RTS;
transmit a downlink transmission to the plurality of wireless communication stations after the plurality of simultaneous CTS responses;
transmit a block acknowledgement request; and
process a simultaneous uplink transmission, the simultaneous uplink transmission comprising two or more simultaneous block acknowledgements received from two or more respective wireless communication stations of the plurality of wireless communication stations after the downlink transmission, wherein the two or more simultaneous block acknowledgements are in response to the block acknowledgement request.

2. The apparatus of claim 1, wherein the block acknowledgement request is configured to address the two or more wireless communication stations.

3. The apparatus of claim 1, wherein the block acknowledgement request is configured to address all of the plurality of wireless communication stations.

4. The apparatus of claim 1, wherein the two or more simultaneous block acknowledgements comprise simultaneous block acknowledgements from all of said plurality of wireless communication stations.

5. The apparatus of claim 1, wherein the downlink transmission comprises simultaneous transmission of a plurality of different downlink data transmissions to respective ones of the plurality of wireless communication stations.

6. The apparatus of claim 1, wherein the reserved time period is configured to cover a duration of the plurality of simultaneous CTS responses, a duration of the downlink transmission, and a duration of the simultaneous uplink transmission.

7. The apparatus of claim 1, wherein a CTS response of the plurality of simultaneous CTS responses is based on scrambling information of the RTS.

8. The apparatus of claim 1, wherein all of the plurality of simultaneous CTS responses are based on same scrambling information of the RTS.

9. The apparatus of claim 1, wherein the RTS comprises a duration value to define the reserved time period.

10. The apparatus of claim 1, wherein the RTS is configured to address the plurality of wireless communication stations.

11. The apparatus of claim 1 comprising a radio to communicate the RTS, the plurality of CTS responses, the downlink transmission, and the simultaneous uplink transmission.

12. The apparatus of claim 11 comprising one or more antennas connected to the radio, and another processor to execute instructions of an operating system.

13. A product comprising one or more tangible computer-readable non-transitory storage media comprising computer-executable instructions operable to, when executed by at least one processor, enable the at least one processor to cause an Access Point (AP) to:
transmit a Request to Send (RTS) configured to reserve a wireless communication medium for a reserved time period for communication between the AP and a plurality of wireless communication stations;
process a plurality of simultaneous Clear to Send (CTS) responses from the plurality of wireless communication stations, the plurality of simultaneous CTS responses received after the RTS;
transmit a downlink transmission to the plurality of wireless communication stations after the plurality of simultaneous CTS responses;
transmit a block acknowledgement request; and
process a simultaneous uplink transmission, the simultaneous uplink transmission comprising two or more simultaneous block acknowledgements received from two or more respective wireless communication stations of the plurality of wireless communication stations after the downlink transmission, wherein the two or more simultaneous block acknowledgements are in response to the block acknowledgement request.

14. The product of claim 13, wherein the block acknowledgement request is configured to address the two or more wireless communication stations.

15. The product of claim 13, wherein the two or more simultaneous block acknowledgements comprise simultaneous block acknowledgements from all of said plurality of wireless communication stations.

16. The product of claim 13, wherein the downlink transmission comprises simultaneous transmission of a plurality of different downlink data transmissions to respective ones of the plurality of wireless communication stations.

17. The product of claim 13, wherein the reserved time period is configured to cover a duration of the plurality of simultaneous CTS responses, a duration of the downlink transmission, and a duration of the simultaneous uplink transmission.

18. The product of claim 13, wherein a CTS response of the plurality of simultaneous CTS responses is based on scrambling information of the RTS.

19. The product of claim 13, wherein all of the plurality of simultaneous CTS responses are based on same scrambling information of the RTS.

20. An apparatus for an Access Point (AP), the apparatus comprising:
  means for causing the AP to reserve a wireless communication medium by:
    transmitting a Request to Send (RTS) configured to reserve the wireless communication medium for a reserved time period for communication between the AP and a plurality of wireless communication stations; and
    processing a plurality of simultaneous Clear to Send (CTS) responses from the plurality of wireless communication stations, the plurality of simultaneous CTS responses received after the RTS; and
  means for causing the AP to communicate with the plurality of wireless communication stations by:
    transmitting a downlink transmission to the plurality of wireless communication stations after the plurality of simultaneous CTS responses;
    transmitting a block acknowledgement request; and
    processing a simultaneous uplink transmission, the simultaneous uplink transmission comprising two or more simultaneous block acknowledgements received from two or more respective wireless communication stations of the plurality of wireless communication stations after the downlink transmission, wherein the two or more simultaneous block acknowledgements are in response to the block acknowledgement request.

21. The apparatus of claim 20, wherein the block acknowledgement request is configured to address the two or more wireless communication stations.

* * * * *